United States Patent
Wang et al.

(10) Patent No.: US 9,200,805 B2
(45) Date of Patent: Dec. 1, 2015

(54) CONDENSER AND METHOD FOR HEAT RECOVERY AND COOLING

(75) Inventors: Wuyin Wang, Vaxjo (SE); Stefan Ahman, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 721 days.

(21) Appl. No.: 13/436,054

(22) Filed: Mar. 30, 2012

(65) Prior Publication Data

US 2013/0255919 A1   Oct. 3, 2013

(51) Int. Cl.
*B01D 53/18* (2006.01)
*F23J 15/04* (2006.01)
*B01D 53/26* (2006.01)

(52) U.S. Cl.
CPC .............. *F23J 15/04* (2013.01); *B01D 53/265* (2013.01); *B01D 2258/0283* (2013.01); *F23J 2217/50* (2013.01)

(58) Field of Classification Search
CPC ..................... B01D 53/265; B01D 2258/0283; F23J 2217/50; F23J 15/04
See application file for complete search history.

(56) References Cited

U.S. PATENT DOCUMENTS

| | | | | |
|---|---|---|---|---|
| 2,838,135 A * | 6/1958 | Pilo | .......................... | C10B 27/00 159/16.1 |
| 3,277,179 A * | 10/1966 | Sze | .......................... | C07C 45/38 261/148 |
| 3,781,407 A * | 12/1973 | Kamijo et al. | ......... | A62C 3/002 220/88.3 |
| 4,009,230 A * | 2/1977 | Smorenburg | ............ | B01D 3/10 202/173 |
| 4,198,388 A * | 4/1980 | Laslo | ................. | B01D 53/1412 261/23.1 |
| 4,763,721 A * | 8/1988 | Becker | .................... | B01D 53/50 165/104.14 |
| 6,017,443 A * | 1/2000 | Buchanan | ............ | C10G 49/002 208/210 |
| 6,059,272 A * | 5/2000 | Potthoff | ................. | B01D 3/008 159/43.1 |
| 2006/0110300 A1 | 5/2006 | Mak | | |
| 2009/0148371 A1 * | 6/2009 | Reddy | .................... | B01D 53/60 423/235 |
| 2011/0061533 A1 * | 3/2011 | Black | ................. | B01D 53/1406 95/195 |
| 2011/0135550 A1 * | 6/2011 | Nagayasu | .......... | B01D 53/1418 423/230 |
| 2012/0215022 A1 * | 8/2012 | Buss | ..................... | C07C 319/20 558/351 |

FOREIGN PATENT DOCUMENTS

DE            3733319            4/1989

* cited by examiner

*Primary Examiner* — Duane Smith
*Assistant Examiner* — Stephen Hobson

(57) ABSTRACT

An apparatus and method to recover heat from and cool flue gases. As shown in FIG. 1, a condenser 10 is provided having two packed beds (20/26) and separate condensate loops. The condensate loops are configured such that first packed bed 20 maximizes heat recovery from flue gas 12 and second packed bed 26 maximizes cooling of flue gas 12. Temperature differences between entry flue gas 12 and recovered condensate 38 are minimized while temperatures differences between exit flue gas 34 and return condensate 54 is also minimized.

17 Claims, 2 Drawing Sheets

CONDENSER AND METHOD FOR HEAT RECOVERY AND COOLING

FIELD

The present disclosure relates to a condenser for treatment of flue gases. More particularly, it relates to an apparatus and method to efficiently recover heat from and cool flue gases.

BACKGROUND

Certain processes, such as combustion of carbon containing fuels, produce gaseous emissions of $CO_2$. $CO_2$ has been identified as a "greenhouse" gas, which appears to contribute to global warming. Because of its status as a "greenhouse" gas, technologies have been developed to decrease $CO_2$ emissions, including: energy efficiency improvements; increased use of renewable energy sources such as solar and wind; promotion of $CO_2$ absorption/conversion in nature (reforestation); reduction in use of fossil fuels; etc.

Notwithstanding these efforts and technologies, fossil fuels continue to provide a substantial portion of the energy generated today. In addition to developing and exploring energy improvements and alternatives, technologies have also been developed to limit or prevent $CO_2$ release from combustion, including $CO_2$ capture and storage (CCS). Employing CCS technologies may substantially reduce the amount of $CO_2$ released to the atmosphere.

There are various methods or techniques utilized for CCS. Technologies generally fall into one of three areas: post combustion capture (PCC), where $CO_2$ is removed after combustion through absorption or other techniques; pre-combustion (PC), where the fuel is converted before combustion such that $CO_2$ is not a product of energy production; and oxy-firing combustion where the fuel is burned in enriched or pure oxygen instead of ambient air to concentrate the $CO_2$ combustion product.

Drawbacks of CCS technologies include increased capital costs and additional energy consumption associated with the technologies. For example, oxy-firing combustion creates a more concentrated stream of $CO_2$, thereby reducing energy and capital costs of processing a flue stream to capture the $CO_2$ for later storage; however, oxy-firing typically requires an energy demanding air separation unit to generate pure or enriched oxygen. To address this drawback, chemical looping combustion (CLC) has been developed using oxygen carriers to deliver oxygen to a fuel reactor. The oxygen carrier is first oxidized in an air reactor and then oxidized carriers are transmitted to a fuel reactor where they are reduced in contact with the fuel. The carrier is then returned to the air reactor for re-oxidation. By using a carrier, combustion is accomplished in an oxygen rich atmosphere without cryogenically creating oxygen rich gas.

Although oxy-firing and CLC systems generally create a flue stream with a higher concentration of $CO_2$ and substantially reduced concentrations of non-reactive components of air (inerts), such as nitrogen, a flue stream will include $H_2O$ as a product of combustion. Moreover, even after initial heat recovery, a flue stream will still have elevated temperatures. $CO_2$ capture and processing is generally accomplished in a gas processing unit (GPU), which separates the $CO_2$ for removal, storage, or reuse, as appropriate. Before a flue stream may be processed in a GPU, $H_2O$, which is gaseous as it exits a fuel reactor in a flue stream, is generally condensed out of the flue stream, leaving substantially concentrated $CO_2$. The flue stream is also cooled before transmission to a GPU. Energy loss can occur both from a failure or inefficient recovery of heat present in a flue stream and from increased energy expenditures in deliberate cooling of a flue stream prior to transmission to a GPU. Moreover, corrosives, such as sulfur dioxide ($SO_2$), may be present in a flue stream and must be cleaned from the flue stream in order to minimize corrosion risks prior to transmission to the GPU.

A condenser may be used to condense water from a flue stream and cool the flue stream. A condenser may be of various types, including a direct contact condenser, which may be a column condenser having a packed bed element. In a condenser having a packed bed element, external heat exchangers may be incorporated for recovery of heat from the flue gases and to assist in cooling of flue gases; however, there is a requirement that difference between temperatures of the flue gas and temperatures of return condensate should be minimized, typically, not more than 4° C. Generally, higher liquid loads are preferred for maximizing cooling of flue gases. The lower the liquid load employed the more area of packing bed needed to cool the flue gases. Increasing the liquid load, however, will cause the temperature difference between flue gases and return condensate to exceed the temperature difference requirement. In order to minimize the difference in temperatures, the liquid load through the packed bed element is reduced, which lowers efficiency of heat transfer from flue stream to condensate flow and reduces cooling of the flue stream. Because of the requirement to minimize the temperature difference, requiring a low liquid load through a packed bed element, a high tower is required to sufficiently condense $H_2O$, which sacrifices cooling of the flue gas. Accordingly, there is a need for an improved condenser and method of cooling a flue stream to more efficiently recover heat from flue gases, cool flue gases for transmission to a GPU and remove sulfur dioxide from the flue gases to avoid corrosion risks.

SUMMARY

According to aspects illustrated herein, there is provided a condenser having a column member with a lower end, an upper end and a wall connecting the lower end and upper end forming a central cavity. A first packed bed is located within the cavity above the lower end. At least a second packed bed is located within the cavity above the first packed bed. A first heat exchanger is configured to receive condensate flow from the first packed bed. A second heat exchanger is configured to receive condensate flow at least in part from the second packed bed. The lower end of the column member is configured to receive flue gases via a gas inlet. The upper end is configured to permit flue gases to exit the column member via a gas outlet. The packed beds are configured to provide a flow of condensate in an opposite direction of a flue gas flow. The first packed bed and condensate flow are configured to maximize heat recovery from the flue gases. The second packed bed and condensate flow are configured to maximize cooling of the flue gases. The first heat exchanger is configured to provide for heat recovery from the condensate of the first packed bed.

According to other aspects illustrated herein, there is provided condenser having a column member with a lower end, an upper end and a wall connecting the lower end and upper end forming a central cavity. A first packed bed is located within the cavity above the lower end. At least a second packed bed is located within the cavity above the first packed bed. The lower end of the column member is configured to receive flue gases via a gas inlet. The upper end allows gases to exit the column member via a gas outlet. The first packed bed is configured to maximize heat recovery from the flue gases. The second packed bed is configured to maximize cooling of the flue gases.

According to other aspects illustrated herein, there is provided a method to recover heat from and cool flue gases by transmitting the flue gases to a condenser having a lower end, an upper end, and a side wall connecting the lower end and upper end to form a column with a central cavity. Flue gases are injected into the lower end of the condenser, transmitted upwards through the condenser, and passed out of the condenser at the upper end of the column. Condensate is formed condensate from the flue gases as the flue gases pass upwards through the condenser. The condenser contains a least two packed beds. A first packed bed is configured to provide efficient heat transfer to condensate distributed to the first packed bed such that heat may be recovered via a first heat exchange. A second packed bed is configured to provide efficient cooling of flue gases prior to flue gases exiting the condenser.

The above described and other features are exemplified by the following figures and detailed description.

BRIEF DESCRIPTION OF THE DRAWINGS

Referring now the figures, which are exemplary embodiments, and wherein the like elements are numbered alike.

DETAILED DESCRIPTION

Figure 1:
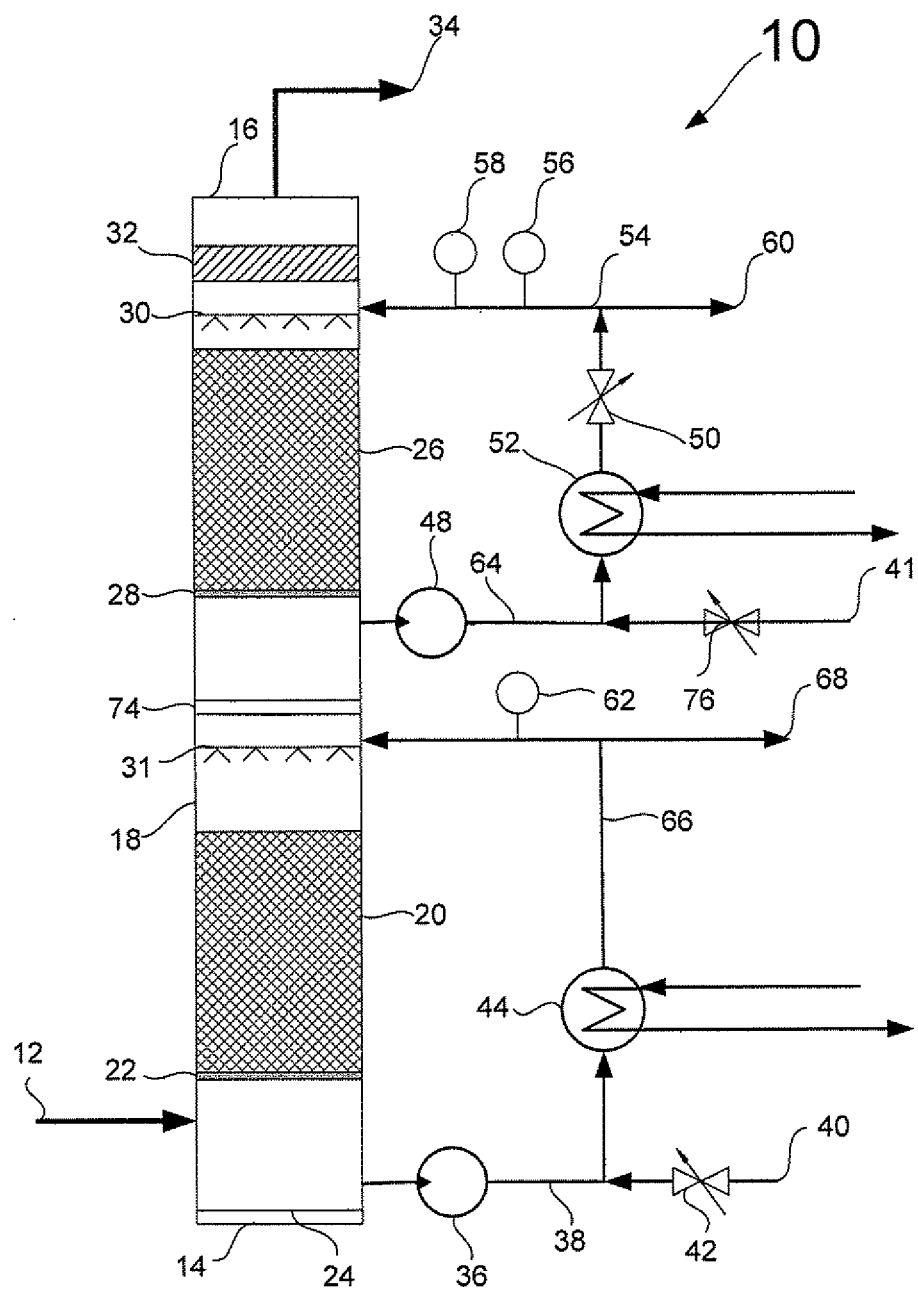
FIG. 1 is a cross-sectional drawing of an exemplary embodiment of the present disclosure.

According to an exemplary embodiment of the present disclosure, a condenser is provided having a column member, which may be generally cylindrical, connected to an upper end and a lower end, forming a central cavity. A first packed bed is located within the central cavity above the lower and at least a second packed bed is located within the central cavity below the upper end and above the first packed bed. Packing materials may include any materials generally used for packing purposes. A first heat exchanger is configured to receive condensate from the first packed bed and a second heat exchanger is configured to receive condensate at least in part from the second packed bed. The second heat exchanger may also receive a portion of condensate from the first packed bed after said condensate first passes through the first heat exchanger. The lower end of the column member is configured to receive flue gases via a gas inlet and the upper end of the column member is configured to permit flue gases to exit the column member via a gas outlet. The packed beds provide a flow of condensate in an opposite direction of a flue gas flow. The first packed bed and condensate flow may be configured to maximize heat recovery from the flue gases. The second packed bed and condensate may be configured to maximize cooling of the flue gases. The first heat exchanger may be configured to provide heat recovery from condensate flow of the first packed bed. The second heat exchanger may be configured to receive cooling liquid to increase cooling of condensate. The present disclosure may incorporate the addition of reagents, which may be sodium hydroxide. Addition of reagents may be controlled through pH measurements. Reagents may be utilized to remove corrosives such as sulfur dioxide.

According to an exemplary embodiment of the present disclosure, a first liquid distributor may be configured to distribute condensate across a top portion of the first packed bed. A first liquid collector, which may be a separate collector or the lower end of the column member, is configured to collect condensate below the first packed bed. A second liquid distributor may be configured to distribute condensate across a top portion of the second packed bed. A second liquid collector may be configured to collect condensate below the second packed bed. In an alternative embodiment, the second liquid collector may be configured to permit a portion of condensate collected from the second packed bed to be distributed across a top portion of the first packed bed. This alternative may include a perforated second liquid collector allowing some condensate to pass through the second liquid collector and fall upon a top portion of the first packed bed.

According to an exemplary embodiment of the present disclosure, at least two separate condensate loops may be included such that the a first condensate loop is configured to receive condensate from the first liquid collector. The first condensate loop may be further configured to distribute condensate to a top portion of the first packed bed. The first condensate loop may be configured such that the condensate flows through the first heat exchanger for heat recovery from the condensate. A second condensate loop may be configured to receive condensate from the second liquid collector. Alternatively, the second condensate loop may be configured to receive condensate from the first heat exchanger or the second liquid collector, or both. The second condensate loop may be configured to distribute condensate to a top portion of the second packed bed. The second condensate loop may include the second heat exchanger which may further receive a cooling liquid. The condensate loops may be configured to permit addition of reagents to control pH. An example reagent may be NaOH. Addition of reagents to control pH allows the present disclosure to clean the flue gases, removing potential corrosives, such as sulfur dioxide.

Accordingly to an exemplary embodiment of the present disclosure, a method is provided to recover heat from and cool flue gases by transmitting the flue gases to a condenser having a lower end, and upper end, and a side wall connecting the lower end and the upper end to form a column with a central cavity. The flue gases may be injected into the lower end of the condenser, transmitted upward through the condenser, and released from the condenser at the upper end. Condensate is formed from the flue gases as the flue gases pass upwards through the condenser, which condenser may have two or more packed beds. A first packed bed may be configured to provide efficient heat transfer to condensate distributed to a top portion of the first packed bed such that heat may be recovered via a first heat exchanger. A second packed bed may be configured to provide efficient cooling of flue gases. Heat recovered in the first heat exchanger may be integrated into a steam cycle. Condensate distributed to the second packed bed may be cooled via a second heat exchanger which may be supplied a cooling liquid.

Referring to the exemplary embodiment shown in FIG. 1, a condenser 10 is provided having a column member 18, which may be generally cylindrical, a lower end 14, and an upper end 16, forming a central cavity. Flue gases enter 12 the condenser 10 via a gas inlet at the lower end 14 and exit 34 the condenser 10 via a gas outlet at the upper end 16. Within the central cavity, a first packed bed 20 rests upon a first support grid 22. Condensate passing through first packed bed 20 may be collected by first liquid collector 24. Alternatively, condensate passing through the first packed bed 20 may be collected by the lower end 14 of condenser 10. Condensate from the first packed bed 20 may be transmitted via a first pump member 36 to a first heat exchanger 44. Reagents 40, such as NaOH, may be added to condensate prior to transmission to first heat exchanger 44. A first valve 42 may be incorporated to control influx of reagent 40. First heat exchanger 44 may be utilized to recover heat for integration into a steam cycle. Condensate 66 may be further transmitted to a first liquid distributer 31. A portion 68 of condensate 66 may be discharged. A first pH meter 62 may be incorporated to measure pH of condensate being returned to the first packed bed 20. Measured pH value may be used to control influx of reagent 40 via first valve 42. First liquid distributor 31 distributes condensate to a top portion of the first packed bed.

Still referring to the exemplary embodiment shown in FIG. 1, within the central cavity, a second packed bed 26 rests upon a second support grid 28. Condensate passing through second packed bed 26 may be collected by second liquid collector 74. The second liquid collector 74 may have openings configured to permit gas to pass from the first bed 20 to the second bed 26. Condensate from the second packed bed 26 may be transmitted via a second pump member 48 to a second heat exchanger 52. Reagents 41, such as NaOH, may be added to condensate prior to transmission to second heat exchanger 52. A second valve 76 may be incorporate to control influx of reagent 41. Second heat exchanger 52 may be configured to receive a cooling liquid. Condensate 54 may be further transmitted to a second liquid distributer 30. Third valve 50 may be incorporated to control a flow of condensate exiting second heat exchanger 52. A portion 60 of condensate 54 may be discharged. A second pH meter 56 may be incorporated to measure pH of condensate being returned to the second packed bed 26. Measured pH value may be used to control influx of reagent 41 via second valve 76. A first temperature gauge 58 may be incorporated to measure temperatures of condensate being returned to the second packed bed 26. Measured temperature may used to control flow of condensate 64. Second liquid distributor 30 distributes condensate to a top portion of the second packed bed 26.

Figure 2:
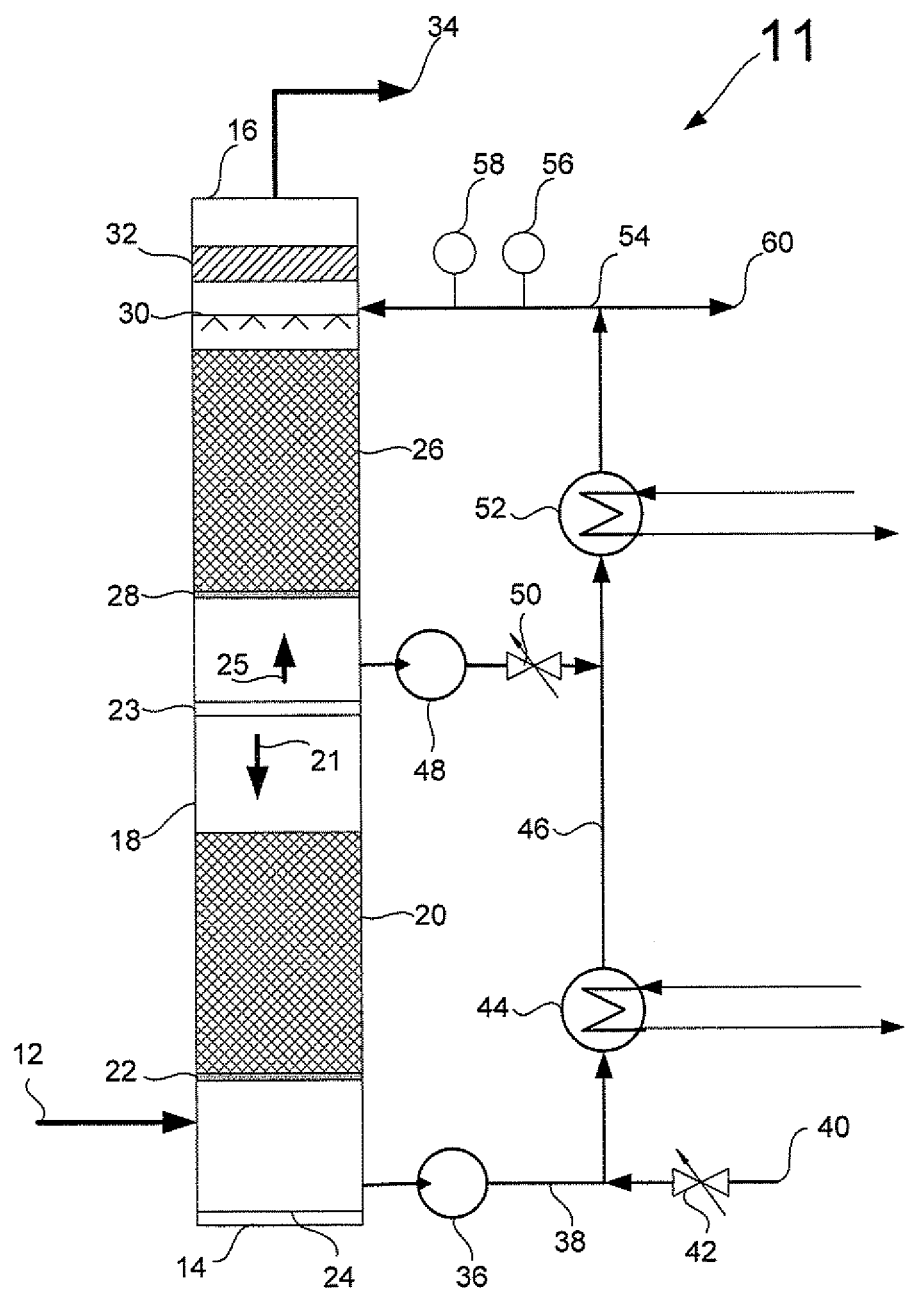
FIG. 2 is a cross-sectional drawing of another exemplary embodiment of the present disclosure.

Referring to the exemplary embodiment shown in FIG. 2, a condenser is provided condenser 11 having column member 18, which may be generally cylindrical, lower end 14, and upper end 16, forming a central cavity. Flue gases enter 12 the condenser 10 via a gas inlet at the lower end 14 and exit 34 the condenser 10 via a gas outlet at the upper end 16. Within the central cavity, first packed bed 20 rests upon first support grid 22. Condensate passing through first packed bed 20 may be collected by first liquid collector 24. Alternatively, condensate passing through the first packed bed 20 may be collected by the lower end 14 of condenser 11. Condensate from first packed bed 20 may be transmitted via first pump member 36 to first heat exchanger 44. Reagents 40, such as NaOH, may be added to condensate prior to transmission to first heat exchanger 44. First valve 42 may be incorporated to control influx of reagent 40 using a pH value measured by the second pH meter 62. First heat exchanger 44 may be utilized for steam generation. Condensate 46 may be further transmitted second heat exchanger 52. Condensate from second packed bed 26 may be added to condensate 46 via second pump 48 prior transmission to second heat exchanger 52. Second valve 50 may be incorporated to control the flow of condensate from the second packed bed 26 to second heat exchanger 52 using a temperature measured by the first temperature gauge 58. In this embodiment a second liquid collector 23 is located below the second packed element 26. Second liquid collector 23 may be configured to permit a portion of condensate from the second packed bed to flow 21 past the second liquid collector and upon a top portion of the first packed element in an opposite direction 25 of flue gases. Reagents 40 may be added via first valve 42 which influx may be controlled by pH measurements of second pH meter 56.

Embodiments of the present disclosure maximize both heat recovery from flue gases and cooling of flue gases prior to transmission of the flue gases to a GPU. Temperature differences of condensate 38 from the first packed bed 20 and flue gas 12 entering condenser (11 or 12) may be maintained below 4° C., potentially below 2° C. Temperature differences of exiting gas stream 34 and condensate stream 54 generally can be below 2° C., potentially less than 1° C. Moreover, if reagents 40/41 are utilized in the present disclosure, efficiently cleaning of flue gases may be accomplished, removing corrosives. $SO_2$ concentration in exit stream 34 may generally be reduced to less than 1 ppmv, potentially below 0.1 ppmv. Thus present disclosure overcomes limitations of prior condensers by utilizing at least two separate packed beds in a condenser column with separate or partially integrated condensate loops which may be separately configured to permit maximum heat recovery in one loop and maximum cooling in another loop.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A condenser, comprising:
   a column member having a lower end, an upper end and a wall connecting the lower end and upper end forming a central cavity;
   a first packed bed within the cavity above the lower end;
   at least a second packed bed within the cavity above the first packed bed;
   a first heat exchanger configured to receive condensate flow from the first packed bed;
   a second heat exchanger configured to receive condensate flow at least in part from the second packed bed, wherein condensate passing through the first heat exchanger is transmitted to the second heat exchanger;
   wherein the lower end of the column member is configured to receive flue gases via a gas inlet;
   wherein the upper end is configured to permit flue gases to exit the column member via a gas outlet;
   wherein the first and second packed beds are each configured to facilitate condensing of a portion of the flue gas to provide a flow of condensate in an opposite direction of a flue gas flow;
   wherein the first packed bed and condensate flow are configured to maximize heat recovery from the flue gases;
   wherein the second packed bed and condensate flow are configured to maximize cooling of the flue gases;
   wherein the first heat exchanger is configured to provide for heat recovery from the condensate of the first packed bed; and
   a second liquid collector configured to collect condensate below the second packed bed, wherein the second liquid collector is configured to permit a portion of condensate collected from the second packed bed to be passed through the second liquid collector to be distributed to the first packed bed; and wherein a portion of the condensate collected from the second packed bed is combined with condensate exiting the first heat exchanger prior to transmission to the second heat exchanger.

2. The condenser of claim 1, further comprising:
a first liquid distributor configured to distribute condensate across a top portion of the first packed bed.

3. The condenser of claim 1, further comprising:
a first liquid collector configured to collect condensate below the first packed bed.

4. The condenser of claim 1,
wherein the second liquid distributor is configured to distribute condensate across a top portion the second packed bed.

5. The condenser of claim 1, wherein a portion of condensate passing through the second heat exchanger is distributed onto a top portion of the second packed bed.

6. The condenser of claim 1, wherein the second liquid collector is configured such that the portion of condensate collected by the second liquid collector passes through the second liquid collector as that portion of the condensate is distributed directly from the second liquid collector to a top of the first packed bed.

7. The condenser of claim 1, wherein the second liquid collector has a plurality of openings through which collected condensate is passable to a top portion of the first packed bed.

8. A method to recover heat from and cool flue gases, comprising:
providing the condenser of claim 1;
transmitting the flue gases to the condenser;
injecting the flue gases into the lower end of the condenser;
transmitting the flue gases upwards through the condenser;
transmitting the flue gases out of the condenser at the upper end of the column;
forming condensate from the flue gases as the flue gases pass upwards through the condenser; and
distributing condensate collected from the second packed bed via the second liquid collector to the first packed bed through the second liquid collector.

9. The method of claim 8, further comprising using heat from condensate of the first packed bed to produce steam.

10. The method of claim 8, further comprising cooling condensate of the second packed bed via a second heat exchange supplied by cooling liquid.

11. The method of claim 8, wherein a portion of condensate from the second packed bed is distributed to the first packed bed.

12. The condenser of claim 1, further comprising:
at least two separate condensate loops.

13. The condenser of claim 12, wherein a first condensate loop is configured to receive condensate from the first packed bed and transmit condensate to the first heat exchanger.

14. The condenser of claim 12, wherein the first heat exchanger is configured to recover heat from condensate for steam production.

15. The condenser of claim 12, wherein the first condensate loop is configured to distribute liquid to a top portion the first packed bed.

16. The condenser of claim 12, wherein a second condensate loop is configured to receive condensate from the second packed bed and transmit condensate to the second heat exchanger.

17. The condenser of claim 16, wherein the second heat exchanger is configured to cool condensate prior to distribution of condensate to a top portion the second packed bed.

* * * * *